(12) United States Patent
Hsu

(10) Patent No.: US 8,422,194 B2
(45) Date of Patent: Apr. 16, 2013

(54) SUSCEPTANCE—MODE INDUCTOR

(75) Inventor: Fu-Tzu Hsu, Taipei City (TW)

(73) Assignees: Chieh-Sen Tu, Taipei County (TW); Fu-Tzu Hsu, Taipei (TW)

( * ) Notice: Subject to any disclaimer, the term of this patent is extended or adjusted under 35 U.S.C. 154(b) by 296 days.

(21) Appl. No.: 12/960,623

(22) Filed: Dec. 6, 2010

(65) Prior Publication Data

US 2012/0139663 A1 Jun. 7, 2012

(51) Int. Cl.
*H03H 7/01* (2006.01)

(52) U.S. Cl.
USPC .......................................... 361/270; 331/175

(58) Field of Classification Search .................. None
See application file for complete search history.

(56) References Cited

U.S. PATENT DOCUMENTS

| | | | |
|---|---|---|---|
| 6,580,248 B2* | 6/2003 | Segger et al. | 318/702 |
| 2002/0093264 A1* | 7/2002 | Raith et al. | 310/179 |
| 2002/0117913 A1* | 8/2002 | Raith et al. | 310/68 R |

* cited by examiner

*Primary Examiner* — Stephen W Jackson
*Assistant Examiner* — Angela Brooks
(74) *Attorney, Agent, or Firm* — Ming Chow; Sinorica, LLC

(57) ABSTRACT

A Susceptance-Mode Inductor with infinite order resonance cavity which includes an inductor section is formed by a physical inductor coil wound about a permanent magnetic materials, with both ends of the coil connecting to a electric damper and a capacitor of the infinite order resonance cavity; thereby that power is coupled into the incoming end of the infinite order resonance cavity through a radio frequency (RF) radiation electric field and the outgoing end thereof is electrically connected to a set of resonance power storage section, or alternatively the incoming end is connected to electric charge and the outgoing end is connected to the load; accordingly, the resonance of the infinite order resonance cavity, thus allowing to convert the current or electron flow at the magnetic field end into charge output by means of Lorenz force.

10 Claims, 6 Drawing Sheets

SUSCEPTANCE—MODE INDUCTOR

BACKGROUND OF THE INVENTION

1. Field of the Invention

The present invention relates to a Susceptance-Mode Inductor in which the storage or use of a galvanic pile allows, with the construction of an infinite order resonance cavity, to cause the charge of the power storage set or power storage section to advantageously provide the effects of fast charge speed, low temperature and energy multiplication, or the extreme discharging effect in the course of discharging; in particular, to an inductor with infinite order resonance cavity.

2. Description of Related Art

In the technical field of fuel cell, such as a conventional zinc fuel power generator device as shown in FIGS. 1 and 2, it may comprise an electric power generator 10, a charger 20 and a set of accumulators 30; the electric power generator 10 includes a reaction chamber 11 on which a carbon rod 12 and a zinc fuel rod 13 are inserted, using electrolyte and graphite as the conductive interface 110 and introducing the oxygen to form oxidation in order to generate electric power. It charges the input end acting as a load 40 to the set of accumulators 30 via the charger 20, and since the electrolyte and graphite are applied as the conductive interface 110 in the reaction chamber 11 of the electric power generator 10, only one single conductive path exists and it creates the "cell" rather than the "battery". In charging the accumulators 30 through the charger 20, to conform to the maximum power transfer theorem (MPTT) of the equivalent circuit as shown in FIG. 3, it can be seen from FIG. 2 that the charger 20 is formed by a charge circuit consisting of an inductor L connected in parallel with a transistor Q along with several capacitors C, and uses a controller 21 to control the transistor Q so as to charge the accumulators 30 in a current charge fashion. Therefore, drawbacks like poor reaction efficiency, reduced electric power storage amount (only half of the maximum value), low charge speed, high charge temperature and incapability of quick discharge in the accumulators 30 (possibly damaging the cell due to high temperature) may occur, and charge and discharge actions are not possible to be performed simultaneously (since there exists only one available path). Such technical issues need to be effectively solved; otherwise, the application of fuel cell will be restricted. The solution to the existence of one single conductive path over the conductive interface 110 of the reaction chamber 11 in the electric power generator 10 involves in the application of dielectric material as the interface, wherein the dielectric factor is the electron, the movement of electrons can be used as the electron flow which is equivalent to general conductors, and infinite sets of paths in the electron flow may exist. In accordance with the infinite order resonance cavity technology disclosed by the present inventors, it is possible to undergo the dynamic resistance matching and infer to the creation of the infinite order resonance cavity, thereby eliminating the issue of system duality and facilitating non-linear dynamic system stabilization, and completely resolving dynamic power factor adjustment, dynamically adaptive damping as well as adaptive full-pass filter; with the infinite order resonance cavity according to the present invention, the passing-by electron flow is allowed to oscillate and generate the damping effect so as to create radio frequency (RF) power with multiple short-circuit electron withdrawals thereby performing charge actions in a voltage charging approach so as to store the electric power in the accumulators as the input end of the load. In this way, the disadvantages in conventional power use/charge processes can be avoided. However, after long-termed tests, currently available accumulator devices or power storage devices or elements can not provide satisfactory results in direct use; for example, although super capacitors have matched various requirements, its short-circuit phenomena in power storage (transient current short-circuit, rectifier circuit damage etc.) are still the technical bottlenecks needed to be overcome. The critical point lies in that the accumulator needs to be capable of performing positive and negative works, and the super capacitor is generated by the polarization of the capacitance after dielectric effect, as below:

$$Xc = \frac{1}{2\pi fc},$$

wherein the frequency f becomes infinite ($\infty$) by polarization after the dielectric effect, and in resonant term $X_C=0$, and as long as the capacitance C is not equal to zero (existence of physical capacitance) it indicates the equivalent capacitance of the super capacitor, as shown in FIG. 4. Consequently, in order to form the intended resonance by making the internal resistance of the galvanic pile become zero in the course of charge, it is indeed required to search for further innovative technical solutions.

SUMMARY OF THE INVENTION

Thus it can be seen that, in order to store electric power in an approach of voltage charging based on radiation (radio frequency, RF) power, a super capacitor used as the power storage set or power storage section is required to perform positive and negative works, and an inductor is needed to make the internal resistance of the galvanic pile become zero, whose inductance is determined by a coil excited by a permanent magnetic materials under the effect of infinite order resonance cavity, as the following expression: $X_L=2\pi fL$, in which the resonance in the frequency f is formed by enabling infinity ($\infty$) through the excitation by a permanent magnetic materials, thereby overcoming the undesirable short-circuit phenomena during the power storage operation of the power storage set or power storage section in the super capacitor so as to build an ideal galvanic pile storage device; and/or, it is also possible to convert the charge released by the power storage set or power storage section in the galvanic pile storage device into the electron flow for use by the load without temperature, and the extreme discharging is allowable.

The objective of the present invention is to provide a Susceptance-Mode Inductor with infinite order resonance cavity which is an electric connection of an infinite order resonance cavity composed of an inductor section and at least one electric damper and a capacitor; the inductor section is formed by a physical inductor coil wound about a permanent magnetic materials, which coil being connected to the electric damper and the capacitor of the infinite order resonance cavity; thereby that power is coupled into the incoming end of the infinite order resonance cavity through an RF radiation electric field and the outgoing end thereof is electrically connected to a resonance power storage section made of a group of dielectric materials; accordingly, the resonance of the infinite order resonance cavity, the damping effect and the charging/discharging action of the inductor section can use the permanent magnetic materials to prevent the magnet field from contracting thus allowing to convert the current at the electric field end into the electron flow output by means of Lorenz force such that charges can be accumulated on the surface of the set of resonance power storage section and polarization effect can be momentarily created so as to convert the charge into the voltage for storage; hence, the issue of maximum power transfer can be effectively resolved and the effects of fast charge speed, low temperature as well as energy multiplication can be achieved. Furthermore, the electric connection between the inductor section and the infinite order resonance cavity is implemented by inducing multiple threads of fine copper wires wound about the permanent magnetic materials such that the current is magnified through the permanent magnetic materials into infinite bundles of electron flows for emission; also, the inductor section herein is a polarized resistive inductor section, and the set of resonance power storage section can be built by a non-polarized resistive super capacitor connected in parallel with a polarized susceptive super capacitor, thereby allowing the polarized resistive inductor section to be able to convert the current into the electron flow, enabling charge accumulation on the surface of the non-polarized resistive super capacitor and, by means of the transient polarization effect in the polarized susceptive super capacitor, converting the charge into the voltage for storage so as to create the voltage charging.

Another objective of the present invention is to provide a Susceptance-Mode Inductor with infinite order resonance cavity which is an electric connection of an infinite order resonance cavity composed of an inductor section and at least one electric damper and a capacitor; the inductor section is formed by a physical inductor coil wound about a permanent magnetic materials, which coil being connected to the electric damper and the capacitor of the infinite order resonance cavity; thereby that power is coupled out from the incoming end of the infinite order resonance cavity through a set of resonance power storage section and the outgoing end thereof is electrically connected to the load; thus the resonance of the infinite order resonance cavity, the damping effect and the resonance between the inductor section and the set of resonance power storage section allow to convert the high density charge outputted from the resonance power storage section into the electron flow to the load as the charge flowing through the inductor section thereby enabling extreme discharging without temperature; also, the electric connection between the inductor section and the infinite order resonance cavity is implemented by inducing multiple threads of fine copper wires wound about the permanent magnetic materials such that the passing-by charges are converted into infinite bundles of electron flows for emission; besides, the inductor section herein is a non-polarized susceptive inductor section and the set of resonance power storage section can be a polarized susceptive super capacitor such that the high density charge outputted by the polarized susceptive super capacitor can be converted into the electron flow to the load by Lorenz force as the charge flowing through the non-polarized susceptive inductor section.

Yet another objective of the present invention is to provide an inductor with infinite order resonance cavity which comprises a first inductor section and a second inductor section; the first inductor section is electrically connected to a first infinite order resonance cavity formed by at least one first electric damper and a first capacitor, and the first inductor section is composed of a first physical inductor coil wound about a first permanent magnetic materials, which coil being electrically connected to the first electric damper and the first capacitor of the first infinite order resonance cavity; the second inductor section is electrically connected to a second infinite order resonance cavity formed by at least one second electric damper and a second capacitor, and the second inductor section is composed of a second physical inductor coil wound about a second permanent magnetic materials, which coil being electrically connected to the second electric damper and the second capacitor of the second infinite order resonance cavity; thereby that power is coupled into the incoming end of the first infinite order resonance cavity through an RF radiation electric field and the outgoing end thereof is electrically connected to the second infinite order resonance cavity and connected in parallel with a resonance power storage section made of a group of dielectric materials, and also that power is coupled out from the incoming end of the second infinite order resonance cavity through the set of resonance power storage section and the outgoing end thereof is the input end of the load; accordingly, the resonance of the first infinite order resonance cavity, the damping effect and the charging/discharging action of the inductor section can use the first permanent magnetic materials to prevent the magnet field from contracting thus allowing to convert the current at the electric field end into the electron flow output by means of Lorenz force such that charges can be accumulated on the surface of the set of resonance power storage section and polarization effect can be momentarily created so as to convert the charge into the voltage for storage; meanwhile, the resonance of the second infinite order resonance cavity, the damping effect and the resonance between the second inductor section and the set of resonance power storage section allow to convert the high density charge outputted from the resonance power storage section into the electron flow to the load as the charge flowing through the second inductor section; accordingly, the voltage charging through the high frequency response formed by the set of resonance power storage section can achieve the effects of fast charge speed, low temperature and energy multiplication, and the extreme discharging and the simultaneous charging/discharging are allowable as well; besides, the electric connection between the first inductor section and the first infinite order resonance cavity is implemented by inducing multiple threads of fine copper wires wound about the first permanent magnetic materials such that the current is magnified through the first permanent magnetic materials into infinite bundles of electron flows for emission; furthermore, the electric connection between the second inductor section and the second infinite order resonance cavity is implemented by inducing multiple threads of fine copper wires wound about the second permanent magnetic materials such that the passing-by charges are converted into infinite bundles of electron flows for emission; additionally, the first inductor section herein is a polarized resistive inductor section, the second inductor section is a non-polarized susceptive inductor section, and the set of resonance power storage section can be built by a non-polarized resistive super capacitor connected in parallel with a polarized susceptive super capacitor, thereby allowing the polarized resistive first inductor section to be able to convert the current into the electron flow, enabling charge accumulation on the surface of the non-polarized resistive super capacitor and, by means of the transient polarization effect in the polarized susceptive super capacitor, converting the charge into the voltage for storage; and also the high density charge outputted by the polarized susceptive super capacitor can be converted into the electron flow to the load by Lorenz force as the charge flowing through the non-polarized susceptive second inductor section.

DETAILED DESCRIPTION OF THE PREFERRED EMBODIMENTS

Figure 5:
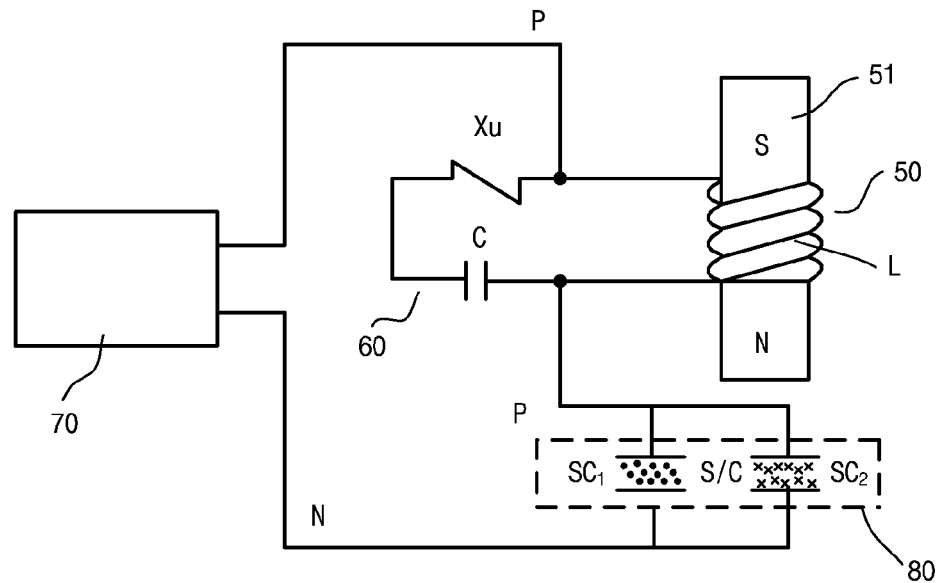
FIG. 5 shows a diagram for the structure of circuit according to a first embodiment of the present invention.

The objective of the present invention is to provide a Susceptance-Mode Inductor, refer initially to FIG. 5, wherein a diagram for an inductor with infinite order resonance cavity is shown, in which an inductor section 50 is electrically connected to an infinite order resonance cavity 60 composed of at least one electric damper Xu and a capacitor C; the inductor section 50 is formed by a physical inductor coil L wound about a permanent magnetic materials 51, which coil being connected to the electric damper Xu and capacitor C of the infinite order resonance cavity 60; thereby that power is coupled into the incoming end of the infinite order resonance cavity 60 through an RF radiation electric field 70 and the outgoing end thereof is electrically connected to a resonance power storage section 80 made of a group of dielectric materials; accordingly, the resonance of the infinite order resonance cavity 60, the damping effect and the charging/discharging action of the inductor section 50 can use the permanent magnetic materials 51 to prevent the magnet field from contracting thus allowing to convert the current at the electric field 70 end into the electron flow output by means of Lorenz force such that charges can be accumulated on the surface of the set of resonance power storage section 80 and polarization effect can be momentarily created so as to convert the charge into the voltage for storage; hence, the issue of maximum power transfer can be effectively resolved and the effects of fast charge speed, low temperature as well as energy multiplication can be achieved; furthermore, the electric connection between the inductor section 50 and the infinite order resonance cavity 60 is implemented by inducing multiple threads of fine copper wires wound about the permanent magnetic materials 51 such that the passing-by current is magnified through the permanent magnetic materials 51 into infinite bundles of electron flows for emission; also, the inductor section 50 herein can be a polarized resistive inductor section 50, and the set of resonance power storage section 80 can be built by a non-polarized resistive super capacitor $SC_1$ connected in parallel with a polarized susceptive super capacitor $SC_2$, thereby allowing the polarized resistive inductor section 50 to be able to convert the current into the electron flow, enabling charge accumulation on the surface of the non-polarized resistive super capacitor $SC_1$ and, by means of the transient polarization effect in the polarized susceptive super capacitor $SC_2$, converting the charge into the voltage for storage so as to create the voltage charging.

Based on the aforementioned first embodiment and by means of the following second embodiment, the present invention allows the galvanic pile for power storage to provide the load with electric power for use through the electron flow, as illustrated below.

Figure 6:
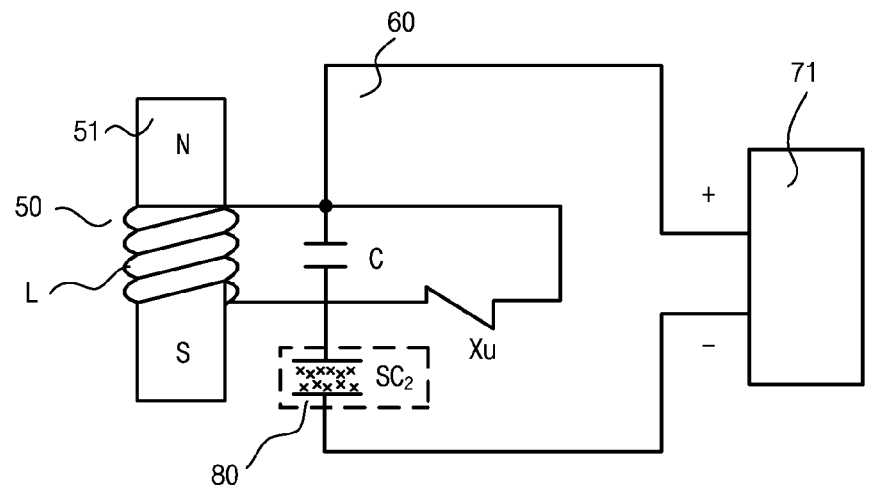
FIG. 6 shows a diagram for the structure of circuit according to a second embodiment of the present invention.

Refer next to FIG. 6, wherein a diagram for an inductor with infinite order resonance cavity is shown, in which an inductor section 50 is electrically connected to an infinite order resonance cavity 60 composed of at least one electric damper Xu and a capacitor C; the inductor section 50 is formed by a physical inductor coil L wound about a permanent magnetic materials 51, which coil being connected to the electric damper Xu and capacitor C of the infinite order resonance cavity 60; thereby that power is coupled out from the incoming end of the infinite order resonance cavity 60 through a set of resonance power storage section 80 and the outgoing end thereof is electrically connected to the load 71; thus the resonance of the infinite order resonance cavity 60, the damping effect and the resonance between the inductor section 50 and the set of resonance power storage section 80 allow to convert the high density charge outputted from the resonance power storage section 80 into the electron flow to the load as the charge flowing through the inductor section 50 thereby enabling extreme discharging without temperature; also, the electric connection between the inductor section 50 and the infinite order resonance cavity 60 is implemented by inducing multiple threads of fine copper wires wound about the permanent magnetic materials 51 such that the passing-by charges are converted into infinite bundles of electron flows for emission; besides, the inductor section 50 herein can be a non-polarized susceptive inductor section 50 and the set of resonance power storage section 80 can be a polarized susceptive super capacitor $SC_2$ such that the high density charge outputted by the polarized susceptive super capacitor $SC_2$ can be converted into the electron flow to the load 71 by Lorenz force as the charge flowing through the non-polarized susceptive inductor section 50.

Based on the aforementioned first and second embodiments and by means of the following third embodiment, the present invention enables a variety of excellent features with regards to power storage and power discharge of the galvanic pile, illustrated as below.

Figure 7:
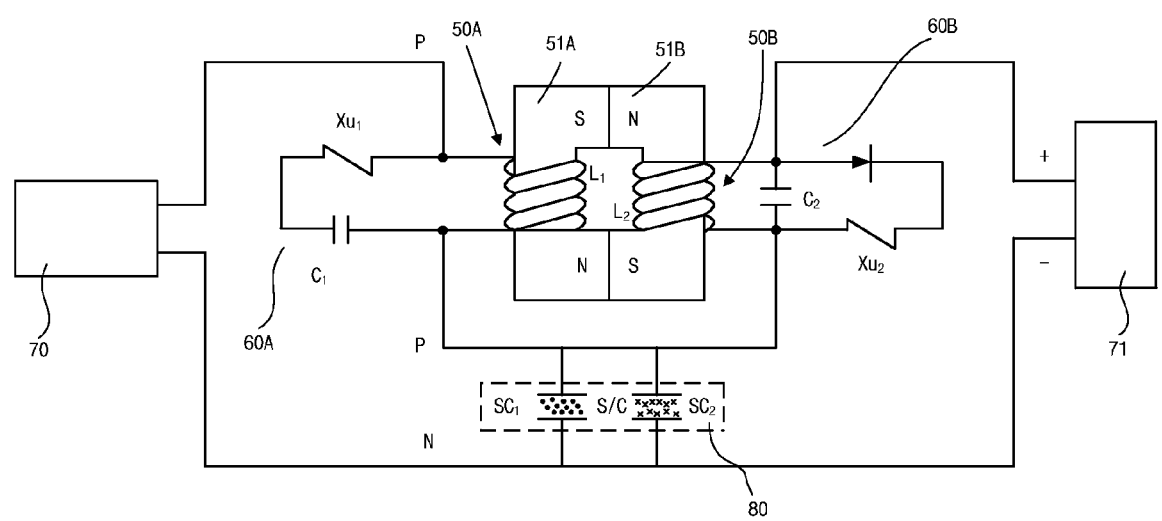
FIG. 7 shows a diagram for the structure of circuit according to a third embodiment of the present invention.

Refer next to FIG. 7, wherein a diagram for an inductor with infinite order resonance cavity is shown, comprising a first inductor section 50A and a second inductor section 50B; the first inductor section 50A is electrically connected to a first infinite order resonance cavity 60A formed by at least one first electric damper $Xu_1$ and a first capacitor $C_1$, and the first inductor section 50 is composed of a first physical inductor coil $L_1$ wound about a first permanent magnetic materials 51A, which coil being electrically connected to the first electric damper $Xu_1$ and the first capacitor $C_1$; the second inductor section 50B is electrically connected to a second infinite order resonance cavity 60B formed by at least one second electric damper $Xu_2$ and a second capacitor $C_2$, and the second inductor section 50B is composed of a second physical inductor coil $L_2$ wound about a second permanent magnetic materials 51B, which coil being electrically connected to the second electric damper $Xu_2$ and the second capacitor $C_2$ of the second infinite order resonance cavity 60B; thereby that power is coupled into the incoming end of the first infinite order resonance cavity 60A through an RF radiation electric field 70 and the outgoing end thereof is electrically connected to the second infinite order resonance cavity 60B and connected in parallel with a resonance power storage section 80 made of a group of dielectric materials, and at the same time that power is coupled out from the incoming end of the second infinite order resonance cavity 60B through the set of resonance power storage section 80 and the outgoing end thereof is the input end of the load 71; accordingly, the resonance of the first infinite order resonance cavity 60A, the damping effect and the charging/discharging action of the first inductor section 50A can use the permanent magnetic materials 51A to prevent the magnet field from contracting thus allowing to convert the current at the electric field 70 end into the electron flow output by means of Lorenz force such that charges can be accumulated on the surface of the set of resonance power storage section 80 and polarization effect can be momentarily created so as to convert the charge into the voltage for storage; meanwhile, the resonance of the second infinite order resonance cavity 60B, the damping effect and the resonance between the second inductor section 50B and the set of resonance power storage section 80 allow to convert the high density charge outputted from the resonance power storage section 80 into the electron flow to the load 71 as the charge flowing through the second inductor section 50B; accordingly, the voltage charging through the high frequency response formed by the set of resonance power storage section 80 can achieve the effects of fast charge speed, low temperature and energy multiplication, and the extreme discharging and the simultaneous charging/discharging are allowable as well; besides, the electric connection between the first inductor section 50A and the first infinite order resonance cavity 60A is implemented by inducing multiple threads of fine copper wires wound about the first permanent magnetic materials 51A such that the passing-by current is magnified through the first permanent magnetic materials 51A into infinite bundles of electron flows for emission; furthermore, the electric connection between the second inductor section 50B and the second infinite order resonance cavity 60B is implemented by inducing multiple threads of fine copper wires wound about the second permanent magnetic materials 51B such that the passing-by charges are converted into infinite bundles of electron flows for emission; additionally, the first inductor section 50A herein is a polarized resistive inductor section 50A, the second inductor section 50B is a non-polarized susceptive inductor section 50B, and the set of resonance power storage section 80 can be built by a non-polarized resistive super capacitor $SC_1$ connected in parallel with a polarized susceptive super capacitor $SC_2$, thereby allowing the polarized resistive first inductor section 50A to be able to convert the current into the electron flow, enabling charge accumulation on the surface of the non-polarized resistive super capacitor $SC_1$ and, by means of the transient polarization effect in the polarized susceptive super capacitor $SC_2$, converting the charge into the voltage for storage; and also the high density charge outputted by the polarized susceptive super capacitor $SC_2$ can be converted into the electron flow to the load by Lorenz force as the charge flowing through the non-polarized susceptive second inductor section 50B.

Based on the aforementioned embodiments, the effects and benefits of the inductor according to the present invention can be clearly appreciated through the following descriptions.

That is, as shown in FIGS. 5, 6 and 7, with regards to the infinite order resonance cavity 60 in the previously-stated first and second embodiments, or alternatively the first infinite order resonance cavity 60A and the second infinite order resonance cavity 60B in the previously-stated third embodiment, the electric damping of which can enable the following effects:

(1) Positive Electric Damping Effect:
1. combining the collected regenerated power with a convex resonator thereby presenting a reactive state;
2. combining the collected regenerated power with a concave resonator thereby presenting a susceptive state;
3. combining a convex resonator with a concave resonator thereby presenting an infinite resonance $-\infty$ Ohm state.

Figure 8:
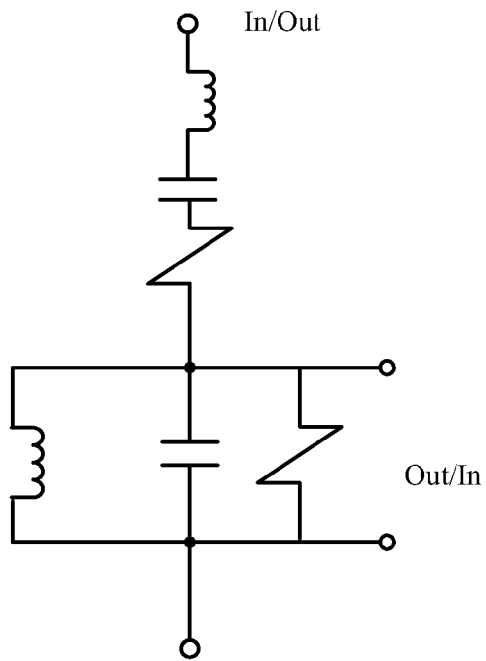
FIG. 8 shows a diagram for the equivalent circuit of the positive electric damping effect in the infinite order resonance cavity.

Consequently, the real work is converted into the virtual work thus presenting a "Sink" state, whose equivalent circuit is shown as FIG. 8.

(2) Negative Electric Damping Effect:
1. combining the collected regenerated power with a convex resonator thereby presenting a susceptive state;
2. combining the collected regenerated power with a concave resonator thereby presenting a reactive state;
3. combining a convex resonator with a concave resonator thereby presenting an infinite resonance $\infty$ Ohm state.

Figure 9:
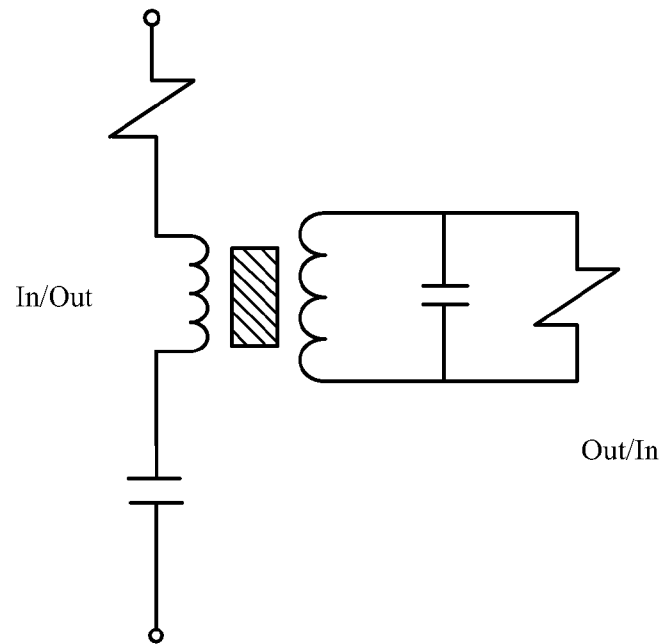
FIG. 9 shows a diagram for the equivalent circuit of the negative electric damping effect in the infinite order resonance cavity.

Consequently, the virtual work is converted into the real work thus presenting a "Source" state, whose equivalent circuit is shown as FIG. 9.

Therefore, as shown in FIG. 7, the application of the inductor in the circuit described herein is also referred as an "RF cell storage" which enables fast charging/discharging operations, no temperature and elimination of maximum power transfer issue, capable of substituting currently available secondary cells. The combination of the polarized reactive first inductor section 50A, the non-polarized susceptive second inductor section 50B, as well as the non-polarized reactive and polarized susceptive super capacitors $SC_1$ and $SC_2$ enables fast charging/discharging operations which are respectively indicated as susceptive and reactive state, $-\infty$ and $+\infty$; in other word, superconductivity or zero-loss.

Figure 1:
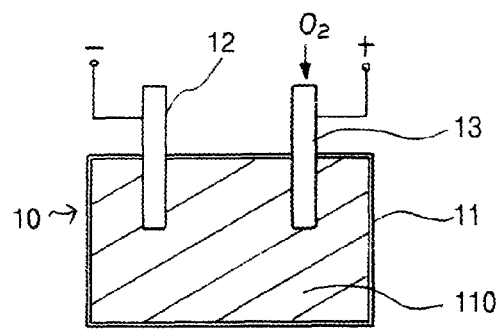
FIG. 1 shows a diagram for the structure of an electric power generator in a conventional zinc fuel electric power device.
Figure 2:
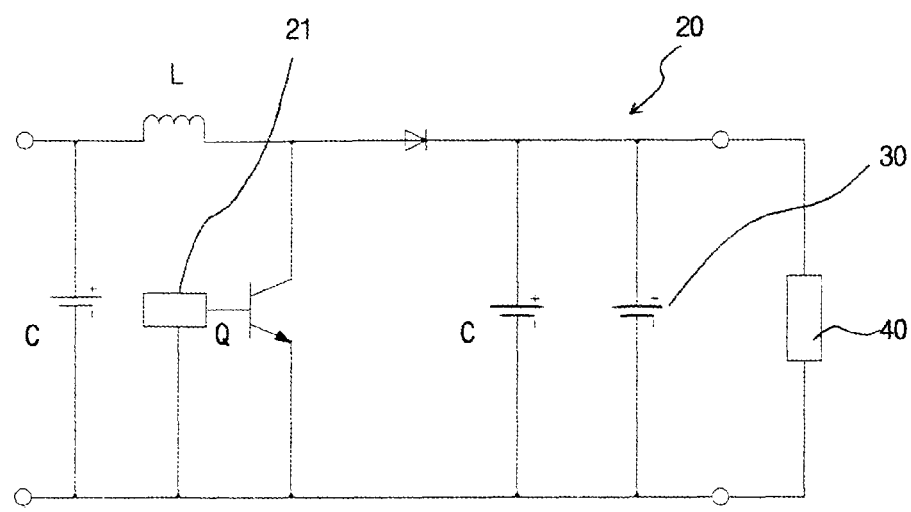
FIG. 2 shows a diagram for the charger circuit in a conventional zinc fuel electric power device.
Figure 3:
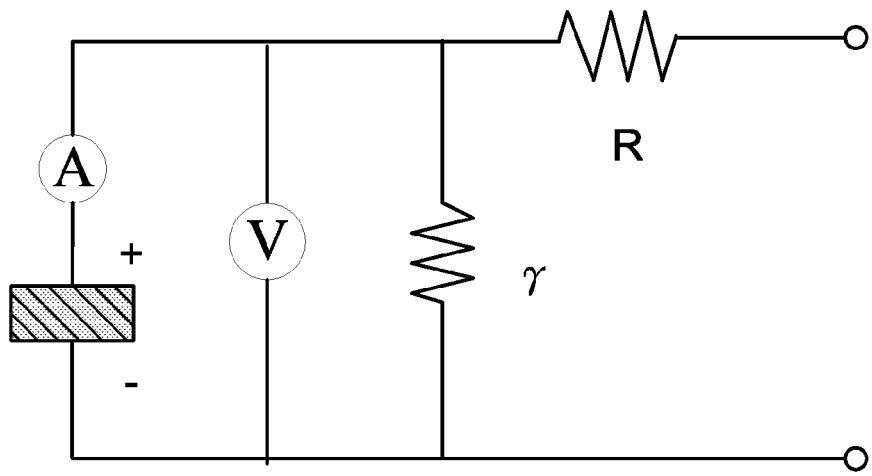
FIG. 3 shows a diagram for the equivalent circuit of the maximum power transfer theorem.
Figure 4:
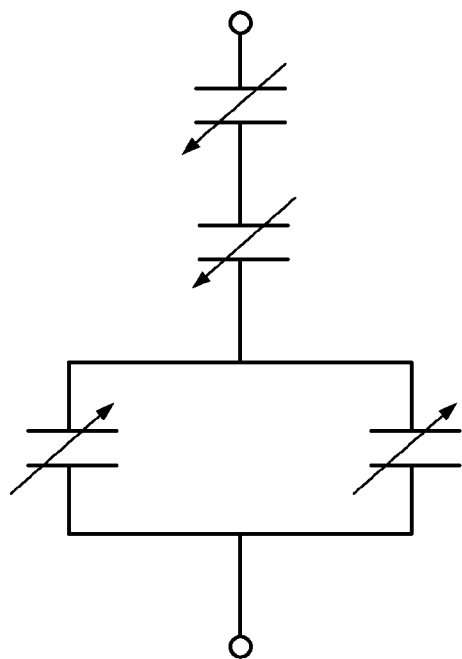
FIG. 4 shows a diagram for the equivalent circuit of a super capacitor.
Figure 10:
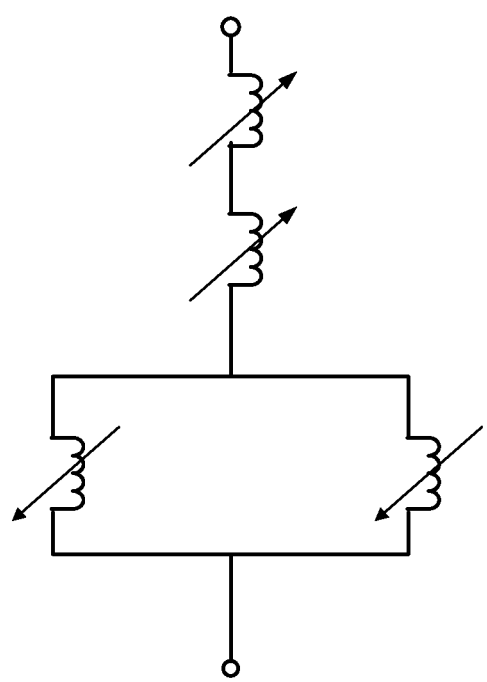
FIG. 10 shows a diagram for the equivalent circuit of a Susceptance-Mode Inductor.

That is, the inductance of the polarized reactive first inductor section 50A and the non-polarized susceptive second inductor section 50B is respectively created by individually exciting the first and the second physical inductor coil $L_1$, $L_2$ with the first and second permanent magnetic materials 51A, 51B, as expressed below: $X_L = 2\pi fL$, in which the frequency f is excited to become $\infty$ respectively by the first and second permanent magnetic materials 51A, 51B, i.e., $X_L = \infty$, and so long as the inductance L is not equal to zero (existence of physical inductance) the inductor can be formed whose equivalent inductor circuit can be depicted as in FIG. 10. Seeing that, as in FIG. 7, the capacitance of the non-polarized resistive, polarized susceptive super capacitor $SC_1$, $SC_2$ is respectively generated by the polarization after dielectric effect, as expressed below:

$$Xc = \frac{1}{2\pi fc},$$

in which the frequency f is $\infty$ by the polarization after dielectric effect, $X_C = 0$, and so long as the capacitance C is not equal to zero (existence of physical capacitance) the super capacitor can be formed whose equivalent capacitor circuit can be expressed as FIG. 4.

If the carried electric energy is $$W(t_1, t_2) = \int_{t_1}^{t_2} p\, dt = \int_{t_1}^{t_2} vi\, dt, \text{ then}$$

-continued $$W_L(t_1, t_2) = \int_{t_1}^{t_2} v i \, dt$$
$$= \int_{t_1}^{t_2} L \frac{di}{dL} i \, dt$$
$$= L \int_{i(t_1)}^{i(t_2)} i \, di$$
$$= \frac{L}{2} i^2 \Big|_{i(t_1)}^{i(t_2)}$$
$$= \frac{L}{2} \{[i(t_2)]^2 - [i(t_1)]^2\}$$

$$W_C(t_1, t_2) = \int_{t_1}^{t_2} v i \, dt$$
$$= \int_{t_1}^{t_2} v C \frac{dv}{dt} \, dt$$
$$= C \int_{v(t_1)}^{v(t_2)} v \, dv$$
$$= \frac{C}{2} v^2 \Big|_{v(t_1)}^{v(t_2)}$$
$$= \frac{C}{2} \{[v(t_2)]^2 - [v(t_1)]^2\}.$$

Suppose i and v both belong to the periodic function $T=t_2-t_1$, then $i(t_2)=i(t_1)$; thus $v(t_2)=v(t_1)$, $W(t_1, t_2)=0$, so no energy will be consumed (referred as virtual work consumption in physics).

Furthermore, as shown in FIG. 7, as the polarized susceptive super capacitor $SC_2$ starts to discharge at the polarized end (in case that the positive and negative poles are connected to the load 51), the OUTPUT is originally expected to transfer the high density charge to the load 51, but not in a form of direct current (DC) which may cause heating in the galvanic pile, so the non-polarized susceptive second inductor section 50B resonates with the polarized susceptive super capacitor $SC_2$; at this moment, the inductor $X_L=2\pi fL$ with $X_L=\infty$, so $f=\infty$ or $L=\infty$. Since the frequency f is excited to be $\infty$ by the second permanent magnetic materials 51B, the internal resistance of the galvanic pile is $\infty$ in discharging. Hence, the high density charge flowing through the non-polarized susceptive second inductor section 50B is converted into the high density electron flow for output toward the load 71 and the issue concerning heat generation is eliminated, thereby allowing extreme discharging (magnitude of current may vary depending on the load 71). Herein the vortex current generated at both ends of the non-polarized susceptive second inductor section 50B (Lenz effect acting in the magnetic field) can be removed by the electric damper $Xu_2$ configured in the infinite order resonance cavity 60B.

In summary of the aforementioned embodiments and descriptions thereof, it can be seen that the application of the present invention allows to provide the following benefits and features:

1. voltage charging (electric energy power);
2. high frequency response (charge and electron flow);
3. reduced charging time (zero internal reactance of galvanic pile);
4. elimination of maximum power transfer issue;
5. no thermal problem;
6. applicability for extreme discharging.

Besides, charging and discharging operations can be performed simultaneously (with insulated input and output).

The descriptions of the present invention is to provide a Susceptance-Mode Inductor, and be illustrated hereinbefore are simply illustrative rather than restrictive. Those skilled ones in the art should appreciate that all effectively equivalent changes, alternations, or modifications to the disclosed embodiments can be made with reference to the specification without departing from the spirit and field of the present invention which are deemed to be encompassed within the scope of the present invention delineated by the following claims.

What is claimed is:

1. A Susceptance-Mode Inductor with infinite order resonance cavity which is an electric connection of an infinite order resonance cavity composed of an inductor section and at least one electric damper and a capacitor; the inductor section is formed by a physical inductor coil wound about a permanent magnetic core, which coil being connected to the electric damper and the capacitor; thereby a power is coupled into an incoming end of the infinite order resonance cavity through an RF radiation electric field and an outgoing end thereof is electrically connected to a resonance power storage section made of a group of dielectric materials; accordingly, a resonance of the infinite order resonance cavity, a damping effect and a charging/discharging action of the inductor section in the infinite order resonance cavity use the permanent magnetic core to prevent a magnet field from contracting thus allowing to convert a current at the electric field end into an electron flow output by means of Lorenz force such that charges be accumulated on the surface of the set of resonance power storage section and polarization effect be momentarily created to convert a charge into the voltage for storage; hence, an issue of maximum power transfer is resolved and the effects of fast charge speed, low temperature as well as energy multiplication are achieved.

2. The Susceptance-Mode Inductor with infinite order resonance cavity according to claim 1, wherein the electric connection between the inductor section and the infinite order resonance cavity is implemented by inducing multiple threads of fine copper wires wound about the permanent magnetic core such that the current is magnified through the permanent magnetic core into infinite bundles of electron flows for emission.

3. The Susceptance-Mode Inductor with infinite order resonance cavity according to claim 1, wherein the inductor section is a polarized resistive inductor section, and the set of resonance power storage section is built by a non-polarized resistive super capacitor connected in parallel with a polarized susceptive super capacitor, thereby allowing the polarized resistive inductor section to be able to convert the current into the electron flow, enabling charge accumulation on the surface of the non-polarized resistive super capacitor and, by means of the transient polarization effect in the polarized susceptive super capacitor, converting the charge into the voltage for storage so as to create the voltage charging.

4. A Susceptance-Mode Inductor with infinite order resonance cavity in which the infinite order resonance cavity is composed of an inductor section and at least one electric damper and a capacitor; the inductor section is formed by a physical inductor coil wound about a permanent magnetic core, which coil being connected to the electric damper and the capacitor; thereby that power is coupled out from the incoming end of the infinite order resonance cavity through a set of resonance power storage section and the outgoing end thereof is electrically connected to the load; thus the resonance of the infinite order resonance cavity, the damping effect and the resonance between the inductor section and the set of resonance power storage section allow to convert the high density charge outputted from the resonance power storage section into the electron flow to the load as the charge flowing through the inductor section thereby enabling extreme discharging without temperature.

5. The Susceptance-Mode Inductor with infinite order resonance cavity according to claim 4, wherein the electric connection between the inductor section and the infinite order resonance cavity is implemented by inducing multiple threads of fine copper wires wound about the permanent magnetic core such that the passing-by charges are converted into infinite bundles of electron flows for emission.

6. The Susceptance-Mode Inductor with infinite order resonance cavity according to claim 4, wherein the inductor section is a non-polarized susceptive inductor section and the set of resonance power storage section is a polarized susceptive super capacitor such that the high density charge outputted by the polarized susceptive super capacitor can be converted into the electron flow to the load by Lorenz force as the charge flowing through the non-polarized susceptive inductor section.

7. A Susceptance-Mode Inductor with infinite order resonance cavity which comprises a first inductor section and a second inductor section; a first infinite order resonance cavity is formed by the first inductor section and at least one first electric damper and a first capacitor, and the first inductor section is composed of a first physical inductor coil wound about a first permanent magnetic core, which coil being electrically connected to the first electric damper and the first capacitor; a second infinite order resonance cavity is formed by the second inductor section and at least one second electric damper and a second capacitor, and the second inductor section is composed of a second physical inductor coil wound about a second permanent magnetic core, which coil being electrically connected to the second electric damper and the second capacitor; thereby that power is coupled into the incoming end of the first infinite order resonance cavity through an RF radiation electric field and the outgoing end thereof is electrically connected to the second infinite order resonance cavity and connected in parallel with a resonance power storage section made of a group of dielectric materials, and also that power is coupled out from the incoming end of the second infinite order resonance cavity through the set of resonance power storage section and the outgoing end thereof is the input end of the load; accordingly, the resonance of the first infinite order resonance cavity, the damping effect and the charging/discharging action of the first inductor section can use the first permanent magnetic core to prevent the magnet field from contracting thus allowing to convert the current at the electric field end into the electron flow output by means of Lorenz force such that charges can be accumulated on the surface of the set of resonance power storage section and polarization effect can be momentarily created so as to convert the charge into the voltage for storage; meanwhile, the resonance of the second infinite order resonance cavity, the damping effect and the resonance between the second inductor section and the set of resonance power storage section allow to convert the high density charge outputted from the resonance power storage section into the electron flow to the load as the charge flowing through the second inductor section; accordingly, the voltage charging through the high frequency response formed by the set of resonance power storage section enables the effects of fast charge speed, low temperature and energy multiplication, and the extreme discharging and the simultaneous charging/discharging are allowable as well.

8. The Susceptance-Mode Inductor with infinite order resonance cavity according to claim 7, wherein the electric connection between the first inductor section and the first infinite order resonance cavity is implemented by inducing multiple threads of fine copper wires wound about the first permanent magnetic core such that the current is magnified through the first permanent magnetic core into infinite bundles of electron flows for emission.

9. The Susceptance-Mode Inductor with infinite order resonance cavity according to claim 7, wherein the electric connection between the second inductor section and the second infinite order resonance cavity is implemented by inducing multiple threads of fine copper wires wound about the second permanent magnetic core such that the passing-by charges are converted into infinite bundles of electron flows for emission.

10. The Susceptance-Mode Inductor with infinite order resonance cavity according to claim 7, wherein the first inductor section is a polarized resistive inductor section, the second inductor section is a non-polarized susceptive inductor section, and the set of resonance power storage section is built by a non-polarized resistive super capacitor connected in parallel with a polarized susceptive super capacitor, thereby allowing the polarized resistive first inductor section to be able to convert the current into the electron flow, enabling charge accumulation on the surface of the non-polarized resistive super capacitor and, by means of the transient polarization effect in the polarized susceptive super capacitor, converting the charge into the voltage for storage; and also the high density charge outputted by the polarized susceptive super capacitor is converted into the electron flow to the load by Lorenz force as the charge flowing through the non-polarized susceptive second inductor section.

* * * * *